United States Patent

Hoyler

[11] 3,760,421
[45] Sept. 18, 1973

[54] DIRECTION CONTROL IN A VEHICLE CONTROL SYSTEM

[75] Inventor: Robert C. Hoyler, Pittsburgh, Pa.

[73] Assignee: Westinghouse Electric Corporation, Pittsburgh, Pa.

[22] Filed: Oct. 26, 1972

[21] Appl. No.: 301,018

[52] U.S. Cl............. 343/225, 340/171 R, 246/63 C
[51] Int. Cl.......................... B611 21/10, H04b 7/00
[58] Field of Search................. 343/225; 340/171 R, 340/23; 246/63, 8

[56] References Cited
UNITED STATES PATENTS

| | | | |
|---|---|---|---|
| 2,609,488 | 9/1952 | Fletcher | 340/171 R X |
| 2,661,070 | 12/1953 | Ferrill, Jr. | 340/171 R X |
| 3,552,692 | 1/1971 | Horeczky | 246/63 C |
| 3,694,751 | 9/1972 | Takahashi et al. | 246/8 X |

Primary Examiner—Donald J. Yusko
Attorney—F. H. Henson et al.

[57] ABSTRACT

First and second antennas are situated adjacent first and second running surfaces respectively of a vehicle roadway. The first and second antennas provide first and second signal manisfestations respectively if a vehicle is to travel in a first direction along the roadway, and the first and second antennas provide the second and the first signal manisfestations respectively if the vehicle is to travel in a second direction along the roadway. The vehicle carries third and fourth antennas which couple with the first and second antennas respectively when the vehicle faces in the first direction, and which couple with the second and first antennas respectively when the vehicle is facing in the second direction. Control logic on the vehicle determines the direction in which the vehicle is to travel in response to the signal manisfestations sensed by the third and fourth antennas.

7 Claims, 8 Drawing Figures

FIG.3.

SPEED CODE GENERATOR

FIG. 4.

SPEED CODE SELECTOR

DIRECTION CONTROL IN A VEHICLE CONTROL SYSTEM

CROSS-REFERENCE TO RELATED APPLICATIONS

Reference is made to U.S. patent application, Ser. No. 101,333, entitled "A Vehicle Movement Control And Detection Method And Apparatus", filed Dec. 24, 1970, now Pat. No. 3,710,100 granted Jan. 9, 1973 on behalf of Robert H. Perry, which application is assigned to the assignee of the present invention.

BACKGROUND OF THE INVENTION

In prior art automatic rubber tired vehicle systems, the direction of travel of the vehicle along the roadway is controlled by the frequency of the control signal which is transmitted to the vehicle from the wayside control equipment. If for example, the wayside control equipment determines that the vehicle should travel in a first direction along the roadway, the control signal for example, has a frequency A, and if the vehicle is to travel in the opposite or second direction along the roadway, the control signal has a frequency B. The vehicle responds to the control signal, and reversing circuits on board the vehicle energize appropriate vehicle drive apparatus such that the vehicle travels in the direction directed. Such a control signalling system however, works only if the vehicle has its front end faced in one direction and its rear end faced in the opposite direction, such that the vehicle always has the same orientation of its front and rear with respect to the first and second directions of the roadway. In instances where the vehicle may be oriented in either direction along the roadway, such as when the roadway has a loop turn-back, or a wye configuration at either or both ends of the roadway the prior art control signalling system may not be used, since in such a prior art system the orientation of the vehicle must always remain the same.

According to the teachings of the present invention, a vehicle control system is disclosed in which the control signals direct the vehicle in which direction to travel independent of the orientation of the vehicle with respect to the first and second directions along the vehicle roadway.

SUMMARY OF THE INVENTION

According to the teachings of the present invention, a system is disclosed for controlling the direction of travel of a vehicle over a vehicle roadway in either one of a first or second direction. A first signal means adjacent the roadway provides a first signal output if the vehicle is to travel in the first direction, and provides a second signal output if the vehicle is to travel in the second direction. A second signal means adjacent the roadway provides the first signal output if the vehicle is to travel in the second direction, and provides the second signal output if the vehicle is to travel in the first direction. Also included are means responsive to the first signal means providing the first signal output and the second signal means providing the second signal output for causing the vehicle to travel in the first direction, and responsive to the first signal means providing the second signal output and the second signal means providing the first signal output for causing the vehicle to travel in the second direction.

DESCRIPTION OF THE PREFERRED EMBODIMENT

Figure 1:
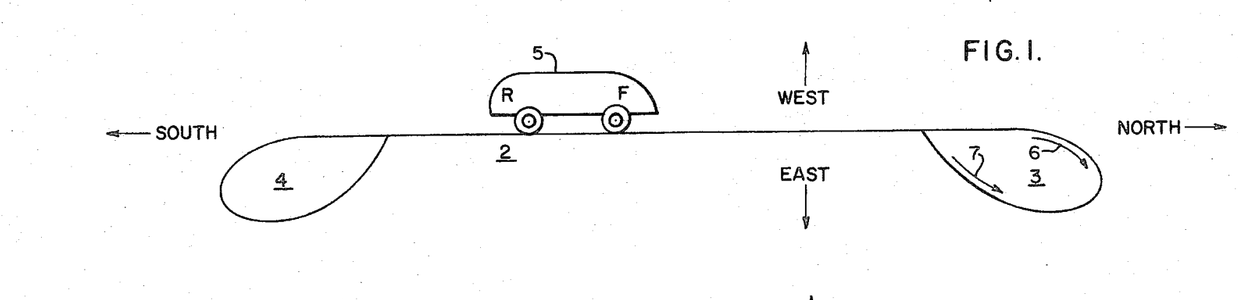
FIG. 1 is a pictorial representation of a vehicle roadway having a loop turn-back at each end.

FIG. 1 illustrates a vehicle roadway 2 having loop turn-backs 3 and 4 at the north and south ends respectively of the vehicle roadway. A vehicle 5 is positioned on the roadway with its front end (F) facing north and its rear end (R) facing south. The directions north, south, east, and west found on FIG. 1 are for reference purposes and ease of description only. It is to be appreciated that the present invention may be practiced regardless of the orientation of the roadway with respect to the previously referenced positions. It is seen that when the vehicle 5 is traveling in a direction from south to north following either direction of the arrow 6 or the arrow 7 around the loop turn-back 3, that once the vehicle has traversed the loop turn-back 3 the front of the vehicle is facing the south and the rear of the vehicle is facing the north. Therefore, a direction and speed control signal transmitted to the vehicle must be received by the vehicle in such a manner that it travels in the direction commanded independent of the front end of the vehicle being positioned in a first direction such as the north, or a second direction such as the south.

Figure 2:
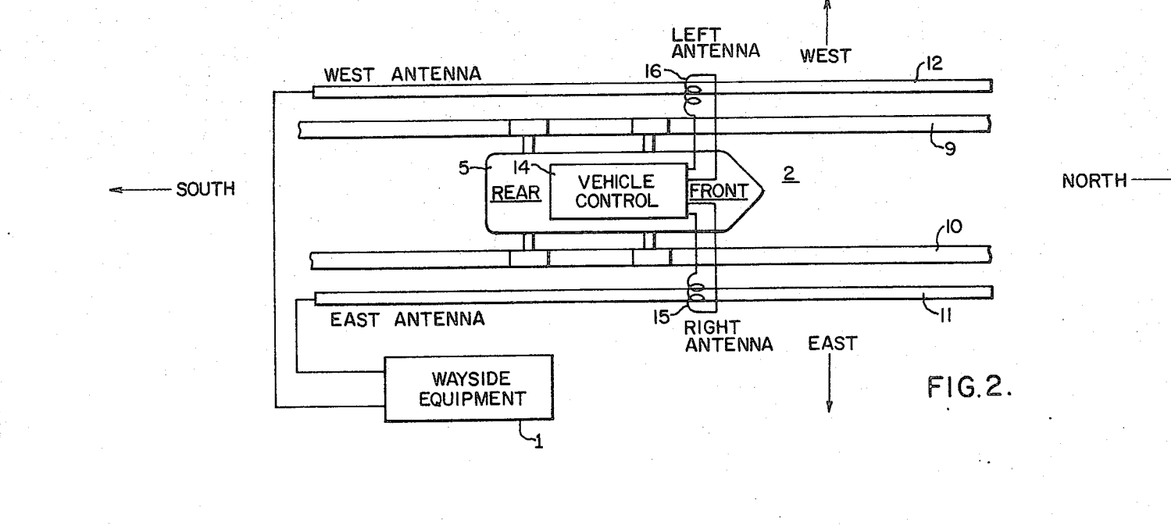
FIG. 2 is a schematic and block diagram representation of a vehicle on a vehicle roadway and the associated wayside and vehicle carried control system.

Refer now to FIG. 2 wherein a section of the roadway 2 is illustrated having running surfaces 9 and 10, respectively. First and second signal means such as an east antenna 11 and a west antenna 12 are positioned adjacent the running surfaces 10 and 9 respectively. The respective antennas are shown as positioned on the outside of the respective running surfaces, however, it is to be appreciated that the antennas may alternatively be positioned inside the running surfaces. Wayside control equipment 12 provides coded speed and direction signals to the antennas 11 and 12. If the vehicle 5 is to travel in a first direction such as north, a coded control signal having a frequency B is provided to the east antenna 11, and a coded control signal having a frequency A is transmitted to the west antenna 12. Alternatively, if the vehicle is to travel in a second direction, such as south, the wayside equipment 12 provides a coded control signal at frequency A to the east antenna 11 and a coded control signal at frequency B to the west antenna 12. The vehicle 5 positioned on the vehicle roadway 2 includes vehicle control apparatus 14 which is coupled to a third antenna such as the right antenna 15 and to a fourth antenna such as the left antenna 16. When the vehicle 5 is facing north, the right antenna 15 couples with the east antenna 11 and the left antenna 16 couples with the west antenna 12. Alternatively, if the front of the vehicle 5 is facing south, the right antenna 15 couples with the west antenna 12 and the left antenna 16 couples with the east antenna 11. The vehicle control device 14 responds to the signal manifestation sensed by the antennas 15 and 16 to determine the direction and speed at which the vehicle 5 is to travel. This will be explained in more detail shortly.

Figure 3:
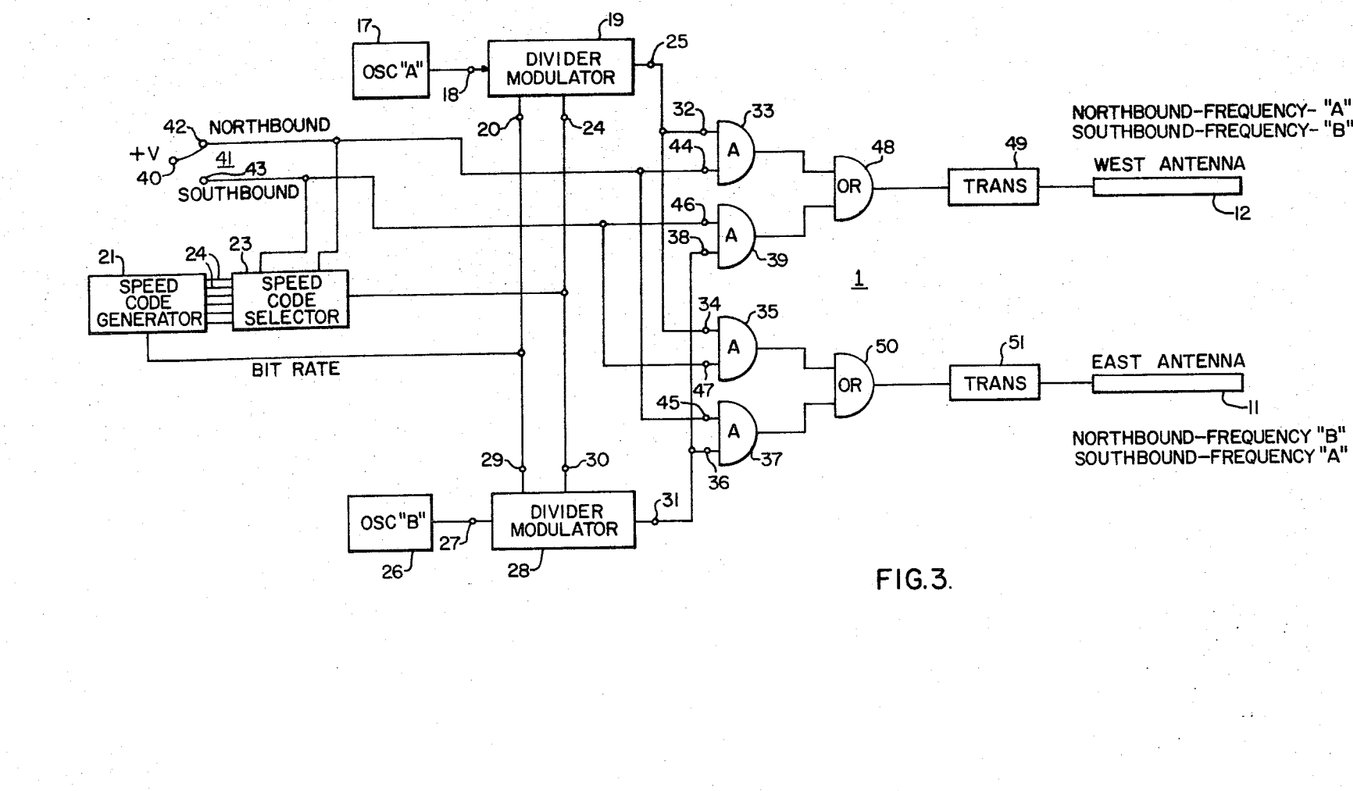
FIG. 3 is a block diagram representation of the wayside control equipment illustrated in FIG. 2.

Refer now to FIG. 3 which is a detailed block diagram of the wayside control equipment 12 illustrated in FIG. 2. An oscillator 17 provides an output signal at a first frequency for example, 80 kilohertz (Khz) to an input terminal 18 of a divider modulator network 19. A bit rate control signal is applied to a second input terminal 20 from a speed code generator 21. The generator 21 also provides a plurality of speed code signals to a speed code selector network 23 via a plurality of lines 24. The speed code selector selects a given one of the plurality of speed codes as the speed code for a given vehicle operational in the system. The speed code is selected by monitoring the vehicle traffic pattern ahead of the given vehicle with reference to the direction of travel. The speed code selected is applied to an input terminal 24 of the divider modulator 19. The divider modulator 19 responds to the latter input signals and for each binary one signal in the speed code a 5 Khz. signal is provided at the output terminal 25 and for each binary zero signal in the speed code applied to the divider modulator 19 a 2.5 Khz. signal is provided at the output terminal 25.

An oscillator 26 provides a second signal at a frequency of for example, 60 Khz. to an input terminal 27 of a divider modulator 28. The bit rate signal from the speed code generator 21 is applied to an input terminal 29 and the selected speed code from the speed code selector network 23 is provided to an input terminal 30. The divider modulator 28 functions in a manner similar to the divider modulator 19. For each binary one bit in the selected speed code applied to the input terminal 30 the divider modulator 28 provides at an output terminal 31 a signal at 3.75 Khz., and for every signal in the speed code selected having a binary zero level applied to the input terminal 30 a signal at a frequency of 1.875 Khz. is provided at the output terminal 31. A detailed description of the operation of a divider modulator network will be given in conjunction with FIG. 6. The output terminal 25 of the divider modulator 19 is connected to a first input terminal 32 of an AND gate 33 and a first input terminal 34 of an AND gate 35. The output terminal 31 of the divider modulator 28 is connected to a first input terminal 36 of an AND gate 37 and to a first input terminal 38 of an AND gate 39. A voltage reference signal +V is connected to a terminal 40 of a switch 41 which serves as a direction selector for initiating the command signal indicative of the direction of travel for the vehicle. It is to be appreciated that this is a simplified representation and in practice the direction selection may be by way of a computer input, a keyboard input or some other type of manual input. The terminal 40 of the switch 41 is switched to a terminal 42 when a vehicle is to travel in a first direction such as north, and is switched to a second terminal 43 if the vehicle is to travel in a second direction such as south. The terminal 42 is connected to a second input terminal 44 of the gate 33 and a second input terminal 45 of the gate 37 and to the speed code selector 23. The terminal 43 is connected to a second input terminal 46 of the gate 39 and a second input terminal 47 of the gate 35 and to the speed code selector 23. It is seen therefore, that if the switch 41 is positioned such that the terminal 42 is receiving the +V signal, the gates 33 and 37 are enabled and the gates and the speed code selector 23 provides an appropriate speed code for travel in a northbound direction. Alternatively, if the switch 41 is positioned such that there is to be travel in the second or southbound direction the voltage signal +V is connected to the terminal 43 and the gates 35 and 39 are enabled and the gates 33 and 37 are disabled and the speed code selector provides an appropriate speed code for travel in a southbound direction. It is seen therefore that if the switch 41 is in the position shown, the gate 33 is enabled and a frequency modulated binary coded speed code signal is provided at the output of the gate and the binary one signal manifestations are at 5 Khz. and the binary zero signal manifestations are at 2.5 Khz. as provided from the output of the divider modulator 19. The signal appearing at the output of the gate 33 is passed by an OR gate 48 to a transmitter 49 which energizes the west antenna 12 with the frequency modulated binary coded speed signal. For purposes of description only, this will be termed a signal at frequency A.

It is seen that the gate 39 is disabled at this time and therefore provides no input signal to the gate 48. The gate 35 is also disabled at this time and therefore provides no input signal to an OR gate 50. The gate 37 however is enabled at this time as it is receiving a +V signal at its input terminal 45. The frequency modulated binary coded speed signal appearing at the output terminal 31 of the divider modulator 28 therefore is passed by the gate 37 and the OR gate 50 to the transmitter 51 which then provides the frequency modulated binary coded speed signal to the east antenna 11. The binary one signal manifestations are at a frequency of 3.75 Khz. and the binary zero signal manifestations are at a frequency of 1.875 Khz. For purposes of description only, this output signal is described as being at frequency B. Consider now that the switch 41 is in the southbound position. Accordingly, the gates 33 and 37 are disabled, and the gate 35 passes the frequency modulated binary coded speed signal at frequency A from the divider modulator 19 to the OR gate 50 which then applies the coded speed signals to the transmitter 51 for transmission by the east antenna 11. In this instance, the east antenna 11 is now transmitting the signal at frequency A. The divider modulator 28 is providing the frequency modulated binary coded speed signal at frequency B to the input terminal 38 of the AND gate 39 and this gate provides the signal to the input of OR gate 48 which in turn couples the signal to the transmitter 49 for energizing the west antenna 12 with a frequency modulated coded speed signal at frequency B. It is seen therefore that if the vehicle is to be instructed to travel in a first direction such as northbound, the west antenna 12 will transmit a coded speed signal at frequency A and the east antenna 11 will transmit a coded speed signal at frequency B. Alternatively, if the vehicle is to travel in a second direction such as southbound, the west antenna 12 will transmit a coded speed signal at frequency B and the east antenna 11 will transmit a coded speed signal at frequency A.

Figure 4:
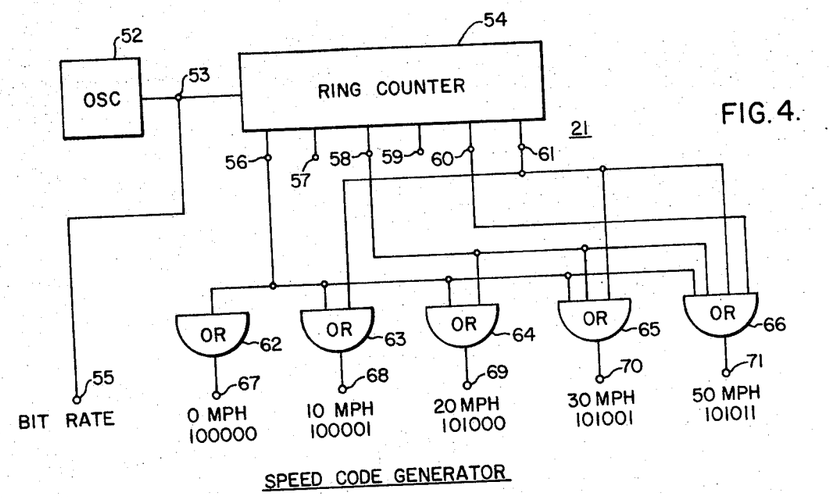
FIG. 4 is a block diagram representation of the speed code generator illustrated in FIG. 3.

Refer now to FIG. 4 which is a block diagram representation of the speed code generator 21 illustrated in FIG. 3. An oscillator 52 provides a periodic signal for example, at an 18 Hertz (Hz.) rate, to an output terminal 53. This periodic signal is then applied to the input of a ring counter 54 and to a terminal 55. The terminal 55, as was previously described, is connected to the input 20 of the divider modulator 19 and the input 29 of the divider modulator 28. The function of this signal will be described shortly. The ring counter 54 counts in response to the provided periodic input signals and provides signals at the outputs of its respective stages 56, 57 58, 59, 60 and 61. The operation of a ring counter is well known in the art and therefore a detailed description of its operation will not be provided. A plurality of gates such as the OR gates 62, 63, 64, 65 and 66 are connected to the respective output terminals of the respective stages of the ring counter 54. The signal output from each of the OR gates is representative of a binary speed code which may or may not be transmitted to a given vehicle operational in the system dependent upon the presence or absence of other vehicles preceding the given vehicle along the vehicle roadway in the direction of travel. The output from the gate 62 is termed a 0 mile per hour (MPH) signal; the signal output from the OR gate 63 is termed a 10 MPH signal; the signal output from the OR gate 64 is termed a 20 MPH signal; the signal output from the OR gate 65 is termed a 30 MPH signal; and the output of the OR gate 66 is termed a 50 MPH signal. The binary code for each of the respective speed signals is shown below the respective output terminals 67, 68, 69, 70 and 71. It is readily apparent how these codes are derived by following the input connections to the respective OR gates from the output connections of the respective stages of the ring counter 34. The signal outputs from the respective gates are connected to inputs of the speed code selector 23 as will be described shortly.

Figure 5:
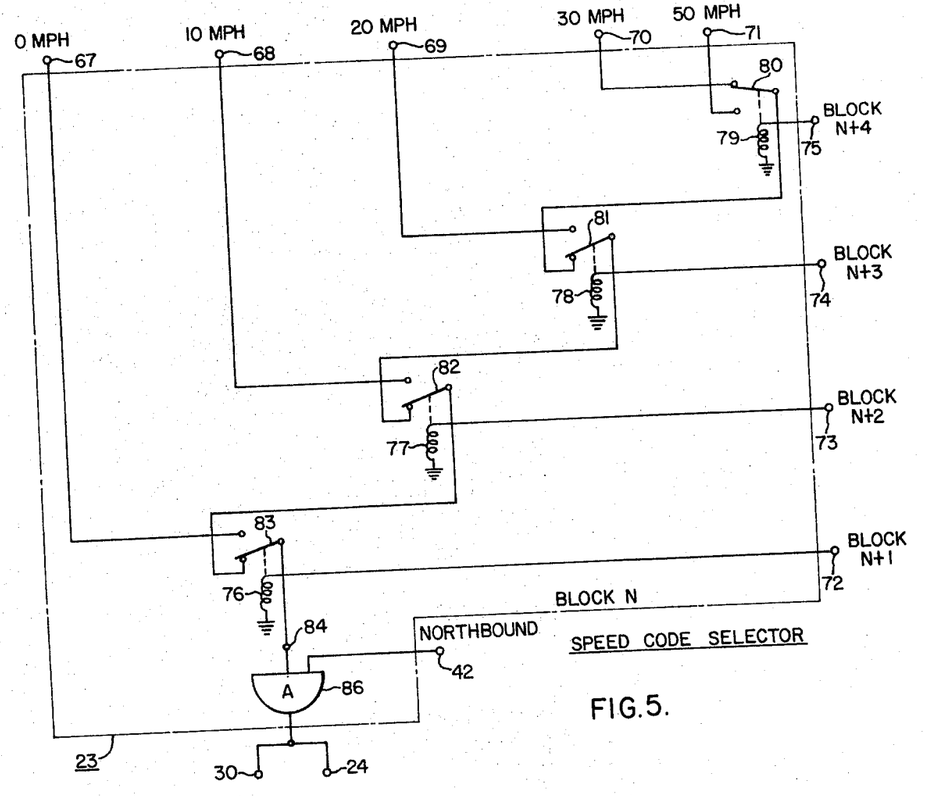
FIG. 5 is a schematic diagram representation of the speed code selector illustrated in FIG. 3.

Refer now to FIG. 5 which is a schematic diagram representation of the speed code selector 23 illustrated in FIG. 3. Block occupancy signals are transmitted from wayside devices (not shown) to the terminals 72, 73, 74 and 75 which signals are indicative of presence or absence of vehicles within the associated vehicle control blocks. Previously referenced U.S. Patent application, Serial No. 101,333 discloses a vehicle detection system including wayside devices which may be used in the practice of this invention. If a vehicle is present in a control block, there will be no signal transmitted to the speed code selector from the wayside detection circuit. If however, the control block is absent a vehicle, a control signal is sent to the speed code selector. For purposes of description only, consider that a given vehicle such as the vehicle 5 is present in a vehicle control block N and that the vehicle control blocks ahead of block N in the direction of travel of the vehicle must be sampled for occupancy to determine the speed at which the vehicle 5 may travel. The consecutive blocks ahead of the block N will be termed block N+1 .... block N+4 and the control signals from these blocks are connected to the input terminals 72–75, respectively. Assume for purposes of description only that vehicle control blocks N+1, N+2, and N+3 are absent a vehicle, and vehicle control block N+4 has a vehicle therein. It is seen therefore that terminals 72, 73 and 74, are receiving input signals from their associated wayside devices, whereas as the terminal 75 is not receiving an input signal since the control block N+4 has a vehicle therein. Accordingly, the relays 76, 77, and 78 are energized whereas the relay 79 is deenergized. Therefore, a 30 mph speed signal is coupled from the input terminal 70 through the contact 80 of deenergized relay 60, through the contact 81 of the energized relay 78, through the contact 82 of the energized relay 77, through the contact 83 of the energized relay 76 to a terminal 84 which is connected to a first input of an AND gate 86. The second input of the gate 86 is connected to terminal 42 of the switch 41. Since switch 41 is in the northbound position, gate 86 is enabled to pass the selected speed code to the inputs 24 and 30 of the divider modulators 19 and 28, respectively. It is seen that if the block N+4 is also absent a vehicle at this time, and accordingly a signal is applied to the relay 79 from block N+4, a 50 mph speed signal is then conducted from the terminal 71 to the terminal 84 as the selected speed code. If the block N+1 is occupied by a vehicle the relay 76 is deenergized and a zero mph speed signal is coupled from the terminal 67 through the contact 83 of the deenergized relay 76 to the terminal 84 as the selected speed code. If the block N+2 is the only block having a vehicle therein the relay 77 is deenergized and a 10 mph signal is coupled from the terminal 68 through the contact 82 of deenergized relay 77, through the contact 83 of the energized relay 76 to the terminal 84 as the selected speed code. If the block N+3 is the only control block having a vehicle therein, the relay 78 is deenergized and a 20 mph speed signal is coupled from the terminal 69 through contact 81 of the deenergized relay 78 through contact 82 of energized relay 77, through contact 83 of energized relay 76 to the terminal 84 as the selected speed code. It is seen therefore that an increasing speed signal is selected if there is an increased number of consecutive control blocks absent a vehicle ahead of the control block in which the vehicle to be controlled is present. It is to be appreciated that similar speed code selection apparatus (not shown) is needed for generating the selected speed code when the vehicle is to travel southbound. Accordingly, block occupancy signals would be needed from control blocks N–1 ... N–4 and an AND gate connected at the output of the selector which is enabled by a +V signal from the southbound terminal 43 of switch 41.

Figure 6:
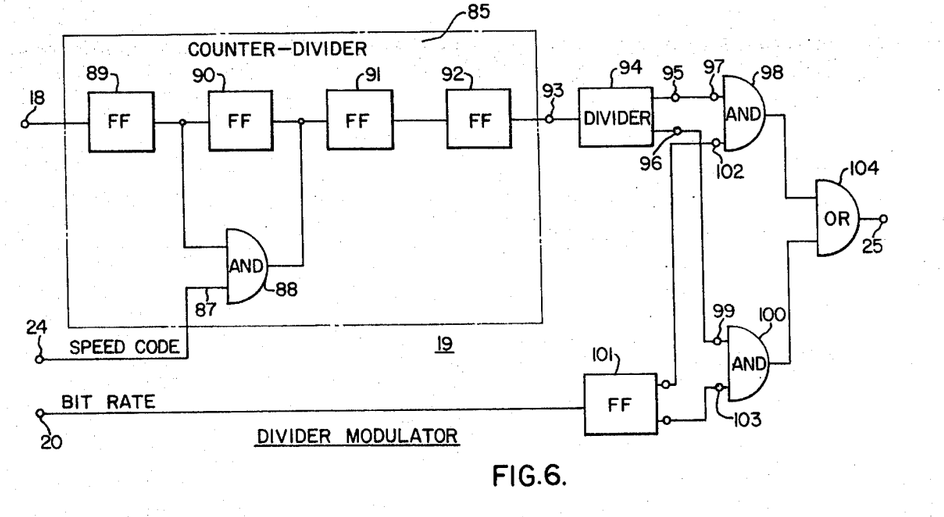
FIG. 6 is a block diagram representation of the divider modulator illustrated in FIG. 3.

Refer now to FIG. 6, which is a block diagram representation of the divider modulator 19 illustrated in FIG. 3. It is to be appreciated that the divider modulator 28 illustrated in FIG. 3 functions in a manner similar to the divider modulator 19, therefore only the description of operation for the divider modulator 19 will be given. An 80 Khz. signal from the oscillator 17 is applied to the input terminal 18 of a counter divider 85. The selected speed code from the output of the gate 86 operative with the speed code selector 23 is applied to a first input terminal 87 of an AND gate 88 which forms part of the counter divider 85. The counter divider 85 also includes a plurality of flip-flops 89, 90, 91 and 92 which form the respective stages of the counter divider. If the speed code signal applied to the first input 87 of the AND gate 88 is at a binary zero level, the AND gate 88 is disabled and the four stages of the counter divider 85 function as a four stage counter and the frequency N of the signal applied to the terminal 18 is divided by 16.

Since the signal N is at 80 Khz. as was previously explained, the signal manifested at the output terminal 93 of the counter divider 85 is a 80 Khz. signal divided by 16 or 5 Khz. which is indicative of a binary zero bit in the speed code being applied to the input terminal 87 of the AND gate 88. On the other hand, if a binary one bit is present in the speed code and is applied to the input terminal 87 of the AND gate 88, it is seen that the flip-flop 90 is bypassed and the counter divider 85 functions as a three stage counter and therefore the frequency N of the signal input is divided by 8. This results in an output signal having a frequency of 10 Khz. appearing at the terminal 93. The signal appearing at terminal 93 is a frequency modulated binary coded signal in which the binary zero signal manifestations one at a frequency of 5 Khz. and in which the binary one signal manifestations are at 10 Khz. The signal appearing at the terminal 93 is then applied to the input of a divider 94 which for example may be another flip-flop. The flip-flop 94 may be omitted in the practice of the invention. In response to the signal input from terminal 93, the divider 94 alternately changes from one state to the other, thereby further dividing the frequency of the input signal by a factor of 2. Therefore, the signals appearing at the output terminals 95 and 96, respectively are out of phase with one another and are at the following frequencies. A 5.0 Khz. signal will be present at the terminals 95 and 96 if the bit in the binary speed code applied to the input terminal 87 of the gate 88 is at a binary one level, and if the bit in the binary speed code is at a binary zero level the output signal will be at 2.5 Khz. The output terminal 95 is coupled to a first input terminal 97 of an AND gate 98 and the terminal 96 is coupled to a first input terminal 99 of an AND gate 100. A flip-flop 101 has its input connected to the input terminal 20 and receives the bit rate signal which is at an 18 Hz. rate from the speed code generator 21. The one output terminal of the flip-flop 101 is connected to a second input terminal 102 of the AND gate 98 and the zero output terminal of the flip-flop 101 is connected to a second input terminal 103 of the AND gate 100. It is seen therefore that for each pulse in the bit rate signal the flip-flop 101 changes state alternately enabling the AND gates 98 and 100. The AND gates 98 and 100 are receiving the out-of-phase frequency modulated signals from the divider 94 at their respective input terminals, therefore, successive bits in the speed code signal alternately are provided at the respective outputs of the gates 98 and 100. Accordingly, the carrier frequency representing successive bits alternately provided at the output of the gates are out-of-phase from one bit time to the next. Accordingly, the signal manifested at the output of the OR gate 104 is a frequency modulated speed signal in which a binary one bit manifestation is at a 5 Khz. frequency and a binary zero bit manifestation is at a 2.5 Khz. frequency. From one bit time to the next, the phase of the output carrier signal reverses. This is done so decoding equipment on the vehicle can differentiate between successive bit times.

Figure 7:
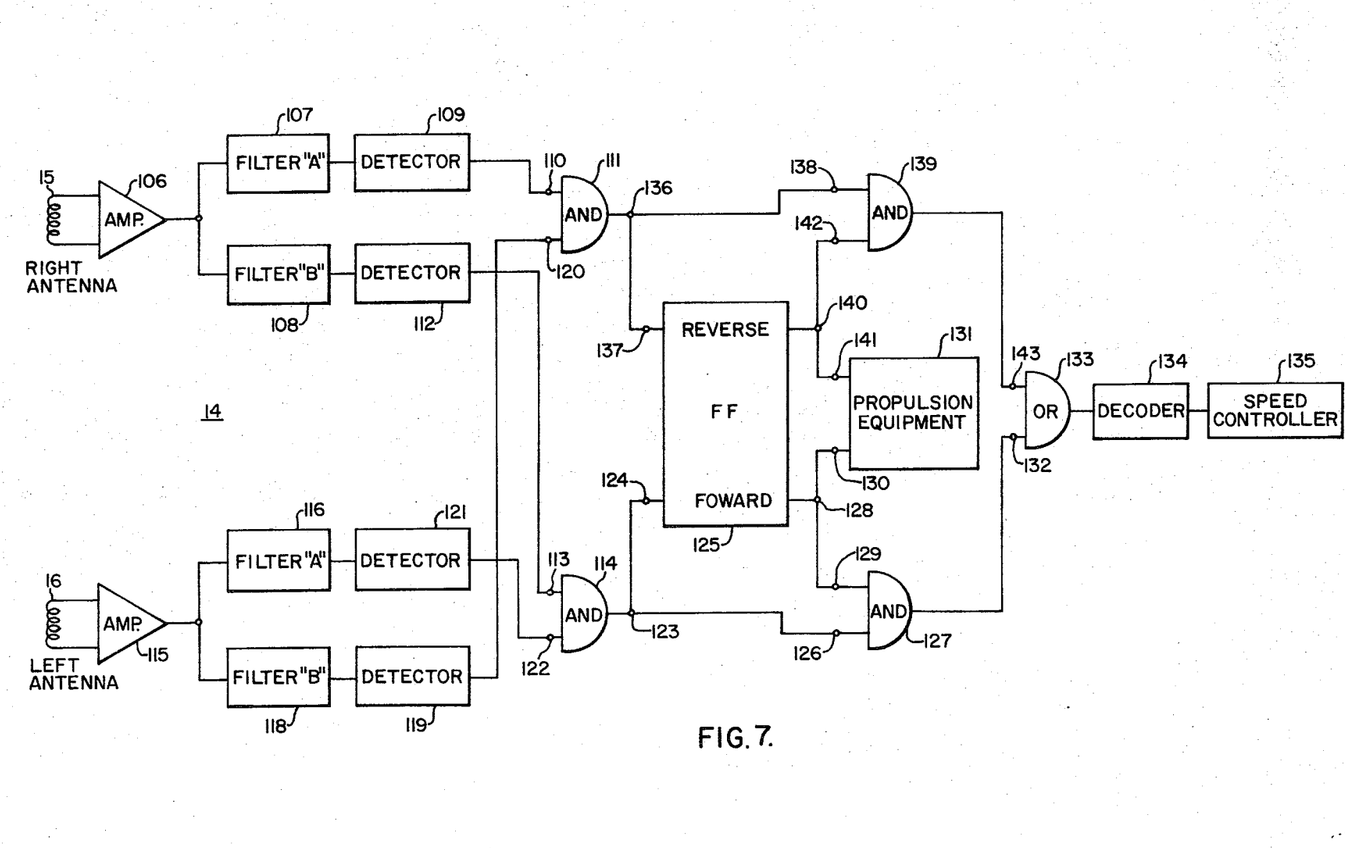
FIG. 7 is a block diagram representation of the vehicle control equipment carried by the vehicle illustrated in FIG. 2.

Refer now to FIG. 7, which is a detailed block diagram representation of the vehicle control equipment carried on board the vehicle 5 as illustrated in FIG. 2. Assume that the vehicle 5 is facing in a first or north direction and is receiving an instruction to travel in the first or north direction. The right antenna 15 therefore is receiving a signal at frequency B from the east antenna 11 and the left antenna 16 is receiving a signal at frequency A from the west antenna 12. The signal at frequency B is coupled from the antenna 15 to an amplifier 106. The amplified signal is then coupled to the inputs of filter networks 107 and 108 which are tuned to the frequencies A and B, respectively. That is, filter 107 passes the signal wherein the binary one and zero signal manifestations are at 5 Khz. and 2.5 Khz., respectively, and filter 108 passes the signal wherein the binary one and zero signal manifestations are at 3.75 Khz. and 1.875 Khz., respectively. Since amplifier 106 is providing a signal output at frequency B, filter 107 provides no output signal to a detector 109 which in turn provides no input signal to a first terminal 110 of an AND gate 111. The filter 108 however passes the signal at frequency B and a detector 112 responds to the frequency coded signal and converts it back to a binary coded signal which is provided to a first input terminal 113 of an AND gate 114. The left antenna 16 provides the signal at frequency A to an amplifier 115 which then provides an amplified signal at frequency A to filters 116 and 118 which are tuned to frequencies A and B, respectively. The filter 118 therefore provides no input signal to a detector 119 which in turn provides no input signal to a second input terminal 120 of the AND gate 111. It is seen therefore that the AND gate 111 is providing no output signal at this time. The filter 116 provides the signal at frequency A to a detector 121 which converts the frequency information back to binary form and the binary coded signal is applied to the input terminal 122 of the AND gate 114. The AND gate 114 has identical binary coded signals applied to its input terminals 113 and 122 at this time and in response thereto provides a binary coded speed signal at an output terminal 23. This signal is applied to a first input terminal 124 of a flip-flop as a forward direction command 125 as a forward direction command and also a first input terminal 126 of an AND gate 127. The flip-flop 125 responds to the forward direction command signal at the input terminal 124 and provides a binary one signal at an output terminal 128 which is coupled to a second input terminal 129 of the AND gate 127 and to a first input terminal 130 of propulsion equipment 131. The signal applied to the terminal 130 of the propulsion equipment 131 instructs the propulsion equipment 131 to drive in a direction such that the vehicle travels in a forward direction which in this instance is the first or north direction. Propulsion equipments are well known in the art so they will not be described in detail at this time. The binary one signal applied to the terminal 129 of the AND gate 127 permits the AND gate 127 to provide the binary speed code signal appearing at the input terminal 126 to an input terminal 132 of an OR gate 133 which passes the binary coded speed signal to a decoder 134 which decodes the speed information and provides a speed signal to a speed controller 135 for controlling the speed of the vehicle.

If the vehicle 5 is to travel in a southbound or second direction and the vehicle is still facing in the first or north direction, it is seen that the right antenna 15 picks up the coded speed signal at frequency A from the east antenna 11 and the antenna 16 picks up the coded speed signal at frequency B from the west antenna 12. Accordingly, the AND gate 114 provides no output signal and the AND gate 111 provides a binary coded speed signal at its output terminal 136. This binary coded speed signal is coupled to a second terminal 137 of the flip-flop 125 as a reverse direction command and to a first input terminal 138 of an AND gate 139. The flip-flop 125 changes state in response to the binary signal applied to the terminal 137 and in response thereto the terminal 128 goes to a binary zero level disabling the AND gate 127 and removing the binary one signal input to the terminal 130 of the propulsion equipment 131. A binary one signal is then manifested at the output terminal 140 of the flip-flop 125 which is coupled as a reverse direction command to a second input terminal 141 of the propulsion equipment 131 and a second input terminal 142 of the AND gate 139. In response to the binary one signal appearing at the terminal 141, the propulsion equipment responds to drive the vehicle in the reverse direction which in this instance is the second or southbound direction. The AND gate 139 passes the binary coded speed signal to a second input terminal 143 of the OR gate 133 which in turn provides the binary coded speed signal to the decoder 134 which in turn transmits the speed signal to the speed controller 135 for controlling the speed of travel of the vehicle over the roadway.

It is readily seen that if the orientation of the vehicle is switched such that the right antenna 15 couples with the west antenna 12 the left antenna 16 couples with the east antenna 11, the vehicle control equipment 14 will respond to the coded speed signals such that the vehicle travels in the direction and at the speed directed by the wayside control equipment 12. If a command is given that the vehicle is traveling in the first or north direction, antenna 15 receives the signal at frequency A and antenna 16 receives the signal at frequency B. Accordingly, gate 114 is disabled and gate 111 is enabled and the vehicle travels in the reverse direction which in this instance is the first direction, north. Alternatively if a command is given that the vehicle travel in the second direction, south, antenna 15 receives the signal at frequency B and antenna 16 receives the signal at frequency A. Accordingly, gate 111 is disabled and gate 114 is enabled and the vehicle travels in a forward direction which in this instance is the second direction, south.

Figure 8:
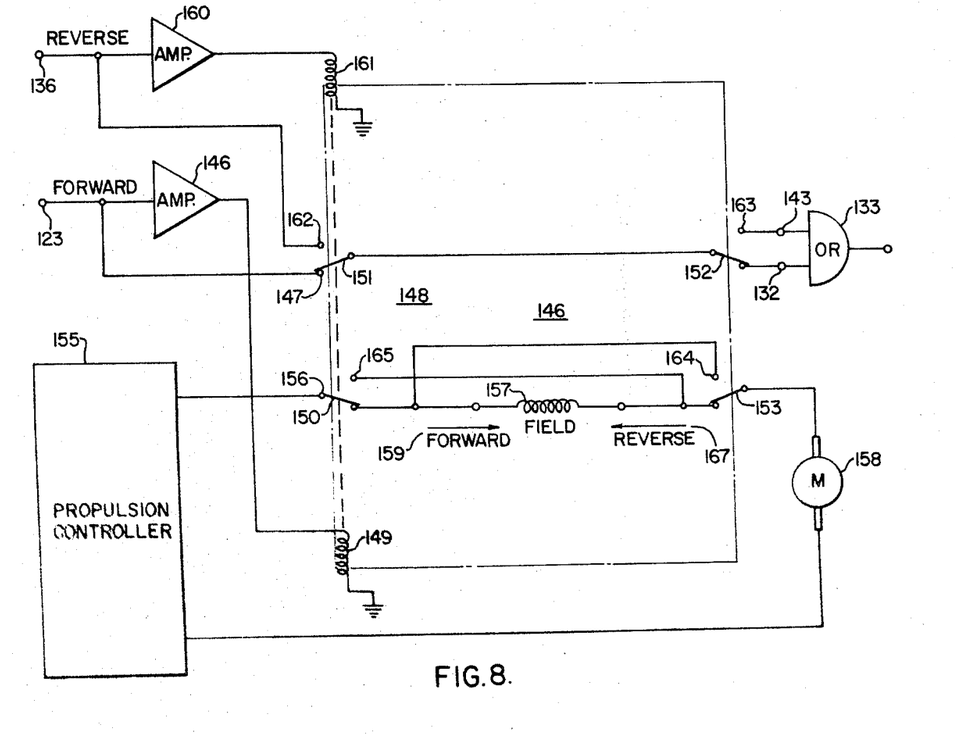
FIG. 8 is a schematic and block diagram representation of a bistable reverser which may be used in the practice of the invention.

Refer now to FIG. 8 which illustrates a bistable reverser 146 which is an alternative embodiment for performing the functions performed by the flip-flop 125, gate 139, gate 127 and the propulsion equipment 131 illustrated in FIG. 7. Assume that the vehicle is facing in the first direction, north and is being commanded to travel in the north direction. The AND gate 114 (see FIG. 7) is applying a binary speed code signal at its output terminal 123 at this time. The AND gate 111 (see FIG. 7) is providing no output signal at its output terminal 136 at this time. The binary signal appearing at the terminal 123 is coupled to the input of a relay driver 146 and to a contact 147 of a bistable relay 148. The amplifier 146 provides an energizing signal to a first coil 149 of the bistable relay 148 for energizing the coil 149 and in response thereto the contacts 150, 151, 152 and 153 are pulled in a downward direction. The binary speed code at terminal 123 is then coupled through the contacts 151 and 152 to the input terminal 132 of the OR gate 133 and the speed code signal is then decoded by the decoder 134 as previously explained and the vehicle travels at the directed rate of speed. A propulsion controller 155 provides drive current at an output terminal 156 to the contact 150 through the field winding 157 through the contact 153 to the vehicle drive motor 158 such that the drive motor drives the vehicle in the forward direction which in this instance is the first direction, north, and the current flows in a direction as illustrated by the arrow 159. If the vehicle again is facing in the north direction but is commanded to travel in the south direction, the terminal 123 receives no input signal at this time from the disabled gate 114 but the input terminal 136 receives a binary speed code signal from the AND gate 111. This binary speed code signal is coupled to a relay driver 160 which applies an energizing signal to a second coil 161 of the bistable relay 148 drawing the relay contacts 150, 151, 152, and 153 upward. That is the relay contact 151 is now removed from the terminal 147 and is connected to a terminal 162. The relay contact 152 is now connected to a terminal 163. The contact 153 is now connected to a terminal 164 and the contact 150 is now connected to a terminal 165. The binary speed code signal appearing at terminal 136 is then conducted through the terminal 162, contact 151, contact 152, terminal 163, to the input terminal 143 of the OR gate 133, and the decoder 134 and speed controller 135 respond to the latter signal to cause the vehicle to travel at the speed indicated. The propulsion controller provides drive current to the terminal 156, through the contact 150, through the terminal 165, through the field winding 157 in the direction as indicated by the arrow 167 through the terminal 164, the contact 153 and the drive motor 158 for causing the vehicle to travel in the reverse direction which in this instance is the second direction, south.

In summary a system has been disclosed for controlling the direction of travel of a vehicle over a vehicle roadway in either one of a first or second direction. A first signal means adjacent the roadway provides a first signal output if the vehicle is to travel in the first direction and provides a second signal output if the vehicle is to travel in the second direction. A second signal means adjacent the roadway provides the first signal output if the vehicle is to travel in the second direction and provides the second signal output if the vehicle is to travel in the first direction. There are means responsive to the first signal means providing the first signal output and the second signal means providing the second signal output for causing the vehicle to travel in the first direction, and responsive to the first signal means providing the second signal output and the second signal means providing the first signal output for causing the vehicle to travel in the second direction.

I claim:

1. In a system for controlling the direction of travel of a vehicle over a vehicle roadway in either one of a first or second direction, the combination comprising:
   a first signal means adjacent said roadway for providing a first signal output if said vehicle is to travel in said first direction and for providing a second signal output if said vehicle is to travel in said second direction;
   a second signal means adjacent said roadway for providing said first signal output if said vehicle is to travel in said second direction and for providing said second signal output if said vehicle is to travel in said first direction; and
   means responsive to said first signal means providing said first signal output and said second signal means providing said second signal output for causing said vehicle to travel in said first direction, and responsive to said first signal means providing said second signal output and said second signal means providing said first signal output for causing said vehicle to travel in said second direction.

2. In a system for controlling the direction of travel of a vehicle over a vehicle roadway in either one of a first or second direction, and wherein said roadway includes first and second running surfaces, the combination comprising:

means for providing first and second signals;
first and second signal means adjacent said first and second running surfaces, respectively;
means for applying said first signal to said first signal means and said second signal to said second signal means for instructing said vehicle to travel in said first direction, and for applying said first signal to said second signal means and said second signal to said first signal means for instructing said vehicle to travel in said second direction; and
means responsive to the application of said first and second signals to said first and second signal means, respectively, for causing said vehicle to travel in said first direction, and responsive to the application of said first and second signals to said second and first signal means, respectively, for causing said vehicle to travel in said second direction.

3. In a system for controlling the movement of a vehicle over a vehicle roadway in either one of a first or second direction, and wherein said roadway includes first and second running surfaces, the combination comprising:

a first antenna adjacent said first running surface;
a second antenna adjacent said second running surface;
means for providing first and second coded speed signals;
means for providing first and second direction signals;
means responsive to the provision of said first direction signal for applying said first and second coded speed signals to said first and second antennas, respectively;
means responsive to the provision of said second direction signal for applying said first and second coded speed signals to said second and first antennas, respectively;
means responsive to the application of said first and second coded speed signals to said first and second antennas, respectively, for causing said vehicle to travel in said first direction, and responsive to the application of said first and second signals to said second and first antennas, respectively, for causing said vehicle to travel in said second direction.

4. The combination claimed in claim 3, wherein the last-named means includes:

a third antenna mounted on said vehicle and which couples with said first antenna when said vehicle is facing in said first direction, and which couples with said second antenna when said vehicle is facing in said second direction; and
a fourth antenna mounted on said vehicle and which couples with said first antenna when said vehicle is facing in said second direction, and which couples with said second antenna when said vehicle is facing in said first direction.

5. The combination claimed in claim 4, further including:

a first signal receiver coupled to said third antenna for sensing the presence of said first or second coded speed signal;
a second signal receiver coupled to said fourth antenna for sensing the presence of said first or second coded speed signal;
first means responsive to said first and second signal receivers sensing the presence of said first and second coded speed signals, respectively, for causing said vehicle to travel in said first direction; and
second means responsive to said first and second signal receivers sensing the presence of said second and first coded speed signals, respectively, for causing said vehicle to travel in said second direction.

6. A method of controlling the direction of travel of a vehicle over a vehicle roadway in either one of a first or second direction, said method comprising the steps of:

providing, at the output of a first signal means adjacent said roadway, a first signal output if said vehicle is to travel in said first direction, or a second signal output if said vehicle is to travel in said second direction;
providing, at the output of a second signal means adjacent said roadway, said first signal output if said vehicle is to travel in said second direction, or said second signal output if said vehicle is to travel in said first direction;
causing said vehicle to travel in said first direction in response to said first signal means providing said first signal output and said second signal means providing said second signal output; and
causing said vehicle to travel in said second direction in response to said first signal means providing said second signal output and said second signal means providing said first signal output.

7. A method of controlling the direction of travel of a vehicle over a vehicle roadway in either one of a first or a second direction, wherein said roadway includes first and second running surfaces, with first and second antennas adjacent said first and second running surfaces, respectively, said method comprising the steps of:

providing first and second coded speed signals;
providing first and second direction signals;
responding to the provision of said first direction signal for providing said first and second coded speed signals to said first and second antennas, respectively, for transmission to said vehicle;
responding to the provision of said second direction signal for providing said first and second coded speed signals to said second and first antennas, respectively, for transmission to said vehicle;
causing said vehicle to travel in said first direction in response to said first and second antennas transmitting said first and second coded speed signals, respectively; and
causing said vehicle to travel in said second direction in response to said first and second antennas transmitting said second and first coded speed signals, respectively.

* * * * *